US008799345B1

(12) United States Patent  (10) Patent No.: US 8,799,345 B1
Liou et al.  (45) Date of Patent: *Aug. 5, 2014

(54) LOW ORDER MULTIPLE SIGNAL CLASSIFICATION (MUSIC) METHOD FOR HIGH SPECTRAL RESOLUTION SIGNAL DETECTION

(75) Inventors: Lihyeh Liou, Centerville, OH (US); David M. Lin, Beavercreek, OH (US); James B. Tsui, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/546,134

(22) Filed: Aug. 24, 2009

(51) Int. Cl.
*G06F 7/32* (2006.01)
*G06F 17/16* (2006.01)

(52) U.S. Cl.
CPC ..................................... *G06F 17/16* (2013.01)
USPC .......................................................... 708/520

(58) Field of Classification Search
None
See application file for complete search history.

(56) References Cited

U.S. PATENT DOCUMENTS

| 6,424,596 | B1 * | 7/2002 | Donald | 367/135 |
| 7,872,583 | B1 * | 1/2011 | Yushkov et al. | 340/572.1 |
| 2009/0060008 | A1 * | 3/2009 | Beadle | 375/148 |
| 2009/0073041 | A1 * | 3/2009 | Ferreol et al. | 342/441 |
| 2010/0271254 | A1 * | 10/2010 | Kanamoto et al. | 342/27 |

* cited by examiner

*Primary Examiner* — Henry Tsai
*Assistant Examiner* — Aurangzeb Hassan
(74) *Attorney, Agent, or Firm* — AFMCLO/JAZ; Fredric Sinder (57) ABSTRACT

A new approach for applying the multiple signal classification (MUSIC) method for high spectral resolution signal detection is described. The new approach uses a lower order covariance matrix, or, alternately, an autocorrelation matrix, to calculate only the number of eigenvalues and associated eigenvectors actually needed to solve for the number of signals sought.

2 Claims, 8 Drawing Sheets

LOW ORDER MULTIPLE SIGNAL CLASSIFICATION (MUSIC) METHOD FOR HIGH SPECTRAL RESOLUTION SIGNAL DETECTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to signal detection, and more specifically to an improved application of the multiple signal classification (MUSIC) method by using a low order covariance matrix.

Electronic warfare (EW) receivers are required to receive simultaneous (time coincident) signals. If the signals are close in frequency and far apart in amplitude, they are difficult to distinguish as separate signals. For example, if the signals are sampled at 2.56 GHz, the input bandwidth is 1.28 GHz. If 256 samples are processed using a fast Fourier transform (FFT) method, the frequency resolution is 10 MHz. In this type of operation, it is difficult to detect signals with frequency separation of less than 10 MHz, which corresponds to the FFT frequency bin size in this example. In FFT-based EW receiver designs, the frequency resolution, that is, the capability to detect, or discriminate between, two signals, is usually larger than the FFT frequency resolution bin. However, operational requirements usually require a receiver to detect signals with closer frequency separations such as 1 MHz.

The multiple signal classification (MUSIC) method is a high spectral resolution method that might be used for digital receiver application, first described by R. O. Schmidt in 1979 in a limited distribution document, and later published in *IEEE Transactions on Antennas and Propagation*, "Multiple Emitter Location and Signal Parameter Estimation," Vol. AP-34, No. 3, pp. 276-280 (March, 1986). Generally, the MUSIC method involves forming an autocorrelation matrix and finding its eigenvalue solution. To achieve a high spectral resolution using the traditional MUSIC method requires a large order number autocorrelation matrix. The computation solving the eigenvalue problem is very time consuming. Therefore, the hardware implementation becomes difficult, especially for receiver applications requiring real time multiple signal detection.

The MUSIC method is an example of a mathematical technique that once appeared to be only of academic interest, but, as the computational speed of computer hardware increases, may prove exceedingly valuable. Still, even with the improved computer hardware speeds just over the horizon, the computational requirements of the traditional MUSIC method are greater than will be able to be implemented for real time signal detection uses.

It is, therefore, an object of the invention to provide a modified MUSIC method that reduces the computational requirements while retaining the high spectral resolution advantages of the original method.

SUMMARY OF THE INVENTION

The present invention provides a modification to the multiple signal classification (MUSIC) method for spectral resolution using a lower order covariance matrix.

The unique discovery of the present invention is that using a lower order covariance matrix than in the traditional MUSIC method provides nearly the same high level of simultaneous signal discrimination as the traditional higher order MUSIC method solutions, but with much lower computational requirements. The order is chosen as only that needed to generate the number of eigenvalues and associated eigenvectors actually needed. For example, the present invention uses an order of 6 for real time series input data, and an order of 3 for complex time series input data, for simultaneous two signal detection with frequency identification or simultaneous three signal detection without frequency identification. With such a small order, the eigenvalue problem of the resulting matrix can be solved easily. It paves a way for possible hardware implementation using the MUSIC method to detect multiple signals with high spectral resolution.

The invention is directed to a method for high spectral resolution using the MUSIC method, including a step of forming a covariance matrix from a set of data points, wherein the order of the covariance matrix is reduced to calculate only the lowest number of eigenvalues and associated eigenvectors needed to solve for the number of signals sought.

The invention is also directed to a method for high spectral resolution using the MUSIC method, including a step of forming a covariance matrix from a set of real data points, wherein the covariance matrix is in the form of:

$$R_{ij} = \sum_{m=0}^{m_{max}} x_{m+p} x_{m+q}$$

and wherein the relationship between i,j and p,q is according to the following table:

| i | 0 | 1 | 2 | 3 | 4 | 5 |
|---|---|---|---|---|---|---|
| j (p, q) | | | | | | |
| 0 | (0, 0) | (0, 1) | (0, 5) | (0, 14) | (0, 38) | (0, 96) |
| 1 | (1, 0) | (1, 1) | (1, 5) | (1, 14) | (1, 38) | (1, 96) |
| 2 | (5, 0) | (5, 1) | (5, 5) | (5, 14) | (5, 38) | (5, 96) |
| 3 | (14, 0) | (14, 1) | (14, 5) | (14, 14) | (14, 38) | (14, 96) |
| 4 | (38, 0) | (38, 1) | (38, 5) | (38, 14) | (38, 38) | (38, 96) |
| 5 | (96, 0) | (96, 1) | (96, 5) | (96, 14) | (96, 38) | (96, 96). |

The invention is further directed to a method for high spectral resolution using the MUSIC method, including a step of forming a covariance matrix from a set of complex data points, wherein the covariance matrix is in the form of:

$$R_{ij} = \sum_{m=0}^{N-ord} x_{m+p} x_{m+q}$$

and wherein the relationship between i,j and p,q is according to the following table:

| i | 0 | 1 | 2 |
|---|---|---|---|
| j (p, q) | | | |
| 0 | (0, 0) | (0, 11) | (0, 128) |
| 1 | (11, 0) | (11, 11) | (11, 128) |
| 2 | (128, 0) | (128, 11) | (128, 128). |

DETAILED DESCRIPTION

The following examples illustrate the differences between prior art fast Fourier transform (FFT) and traditional high order MUSIC method solutions for resolving two signals and a low order MUSIC method solution according to the present invention.

Figure 1A:
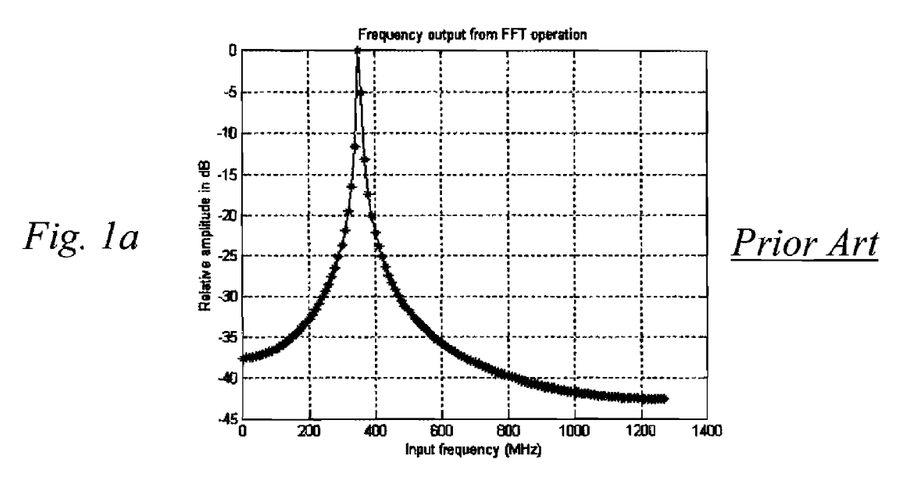
FIG. 1a is a graph of the computed frequency output over the entire frequency range from using FFT for resolving two signals from a set of data according to the teachings of the prior art.
Figure 1B:
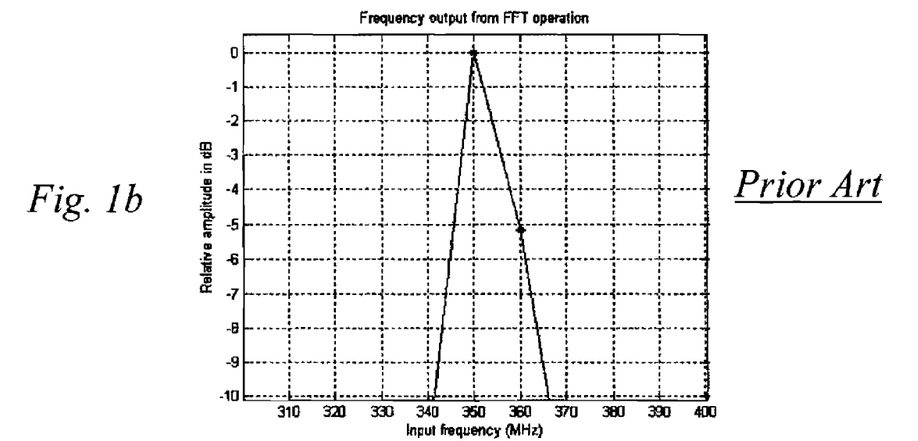
FIG. 1b is a close-up graph of the FIG. 1a results near the signal peak.

The two signals in a first example are two real (not complex) with a strong signal 100 dB above noise and a weak signal 39 dB below the strong one. Their frequencies are separated by 1 MHz. The computed result using an FFT operation is shown in FIGS. 1a and 1b. FIG. 1a shows the entire frequency range and FIG. 1b shows the close in plot of the input signal. Both plots show only one signal. The weak signal cannot be found. In this plot, the frequency bin resolution is 10 MHz, which is limited by the size of the FFT length.

Conventional Music Method

The MUSIC method is a high spectral resolution method that can detect signals with very close frequency. FIGS. 2a and 2b and FIGS. 3a and 3b apply two different order traditional MUSIC method to the same signal data points used in the example of FIGS. 1a and 1b. For the example just shown, two different order traditional MUSIC methods are used to process the input. One MUSIC method uses an order of 80 and the next one uses an order of 50. The results are shown in FIGS. 2a and 2b, and FIGS. 3a and 3b, respectively.

Figure 2A:
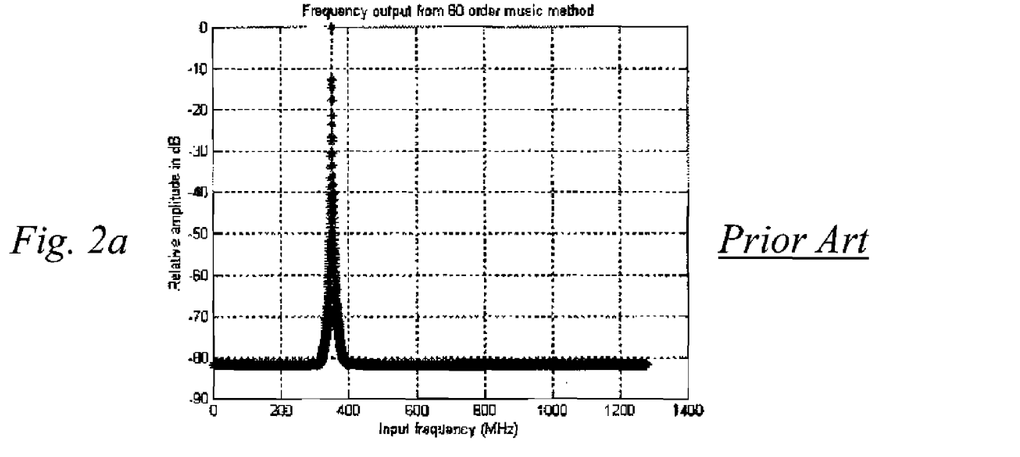
FIG. 2a is a graph of the computed frequency output over the entire frequency range from using an 80 order conventional MUSIC method solution according to the teachings of the prior art.
Figure 2B:
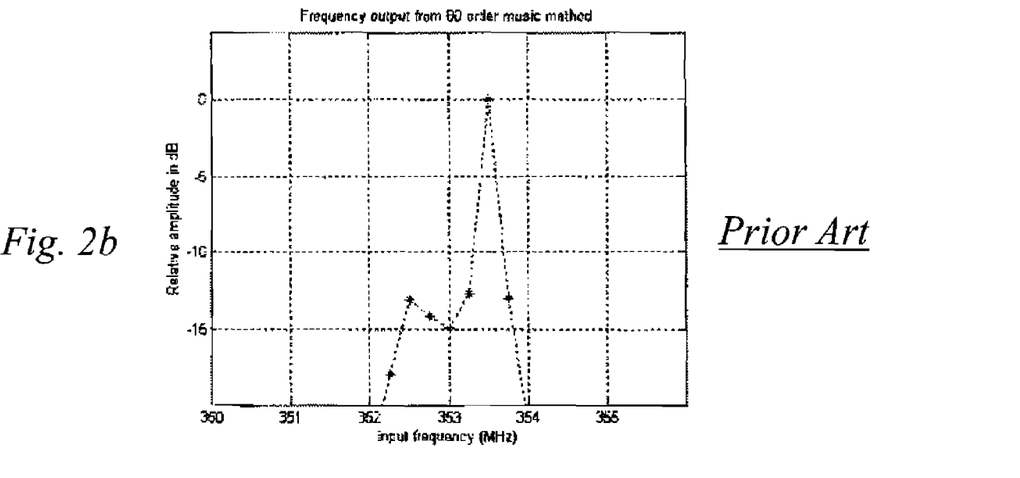
FIG. 2b is a close-up graph of the FIG. 2a results around the signal peaks.

FIG. 2a shows the entire frequency range of the computed signal and reveals only one signal. FIG. 2b shows a close in plot of the input signal and clearly reveals two signals. The frequency bin resolution is ¼ MHz, which is not limited by the input data length.

Figure 3A:
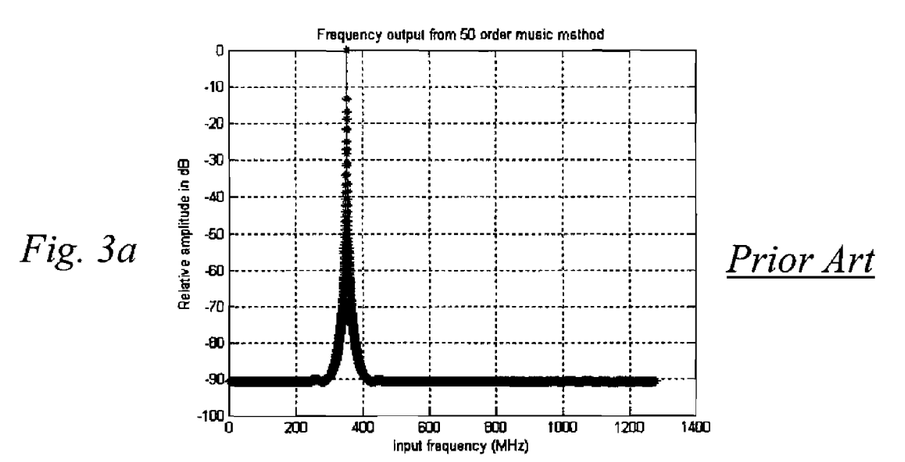
FIG. 3a is a graph of the computed frequency output over the entire frequency range from using a 50 order conventional MUSIC method solution according to the teachings of the prior art.
Figure 3B:
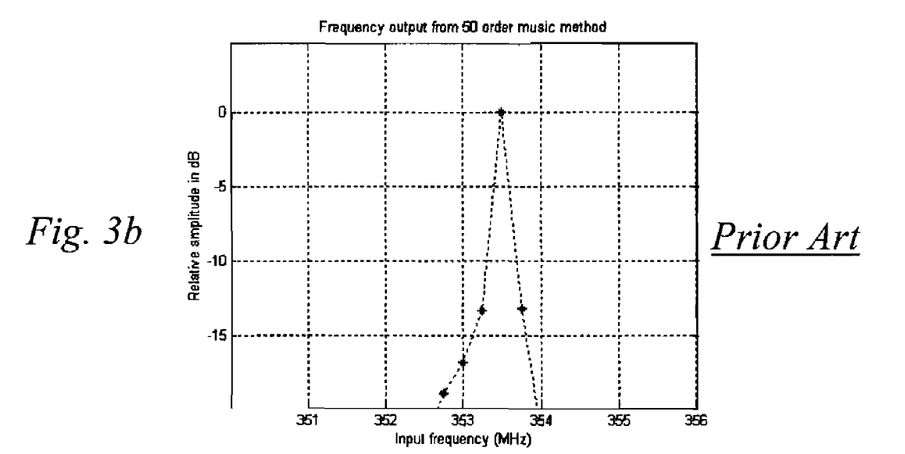
FIG. 3b is a close-up graph of the FIG. 3a results around the signal peak.

FIG. 3a shows the entire frequency range and FIG. 3b shows the close in plot of the input signal. Although FIG. 3b indicates there is another signal, the second signal does not show a peak value. In other words, the second signal cannot be detected.

From these two MUSIC method solution examples, the prior art teaches that in order to separate two signals close in frequency and far apart in amplitude using the traditional MUSIC method, the order must be very high. High order MUSIC method requires complicated calculations. For example, even the 50 order MUSIC method requires finding the eigenvalue and eigenvector of a 50 by 50 matrix, containing 2500 elements. In order to find the two signals, one must deal with an 80 by 80 matrix.

An EW receiver must operate in near real time. The extensive calculations needed to solve the large matrices cannot be implemented in real time operation with today's technology. In order to implement the MUSIC method in near real time, the order must be low. The present invention shows a low order MUSIC method that can detect signals with close frequency separation and far apart in amplitude.

Real Signals

First, consider that the input signals are real values. Real valued data are collected from a single channel and one analog-to-digital converter (ADC).

In the conventional MUSIC method, the input signal is used to form a covariance matrix for the MUSIC method operation. The covariance matrix is formed from input data with different delays. The input data is:

$$x = x_0, x_1, x_2, \ldots x_{N-1} \quad (1)$$

where N is the total number of data points. In this example, N=256.

For the 80 order MUSIC method, the covariance matrix is formed with delay from 0 to 79. The elements of the covariance method can be obtained as:

$$R_{ij} = \sum_{m=0}^{N-ord} x_{m+i} x_{m+j} \quad (2)$$

where ord is the order of the MUSIC method. In this case, ord=80. The values of i and j are from 0 to 79.

According to the MUSIC method, in order to find the frequency, one must form the noise subspace. Both noise subspace and signal subspaces are computed from solving the eigenvalue problem for the covariance matrix. A scanning signal vector s must be generated as:

$$s = \exp(j2\pi ft) \quad (3)$$

where f is the frequency with desired resolution and t is the time vector given by:

$$t = [t_0, t_1, t_2, \ldots, t_{Ord-1}] \quad (4)$$

where $t_0, t_1, t_2, \ldots, t_{Ord-1}$ are the sampling time from 0 to ord-1. The frequency bin resolution of the scanning signal vector is not limited by the input data length, but can be arbitrarily chosen. In order to distinguish two signals separated by 1 MHz as shown in this example, the frequency bin width is selected as 0.25 MHz.

The power spectrum defined by the MUSIC method is given by:

$$p = \frac{1}{s'(V_n' V_n)s} \quad (5)$$

where the denominator represents the projection of the scanning frequency vector s on the noise subspace $V_n$. The scanning signal vector with a correct frequency will be perpendicular to the noise subspace and, under this condition, the projection will be very small. As a result, the power spectrum will show a peak. For real signals (not complex), each signal affects two eigenvalues and their associated eigenvectors. For two signals, four eigenvalues and their associated eigenvectors correspond to the signals. The rest of the eigenvalues and eigenvectors correspond to noise. In the above equation, the noise subspace is formed from 76 (=80–4) noise eigenvectors.

In this new approach to detect two signals, the smallest order is 6. This order will warrant at least two eigenvalues corresponding to noise. The covariance matrix is obtained through an equation similar to Equation 2, which can be written as:

$$R_{ij} = \sum_{m=0}^{m_{max}} x_{m+p} x_{m+q} \quad (6)$$

The relationship among i (row index), j (column index), and (p,q) is expressed in the following Table I.

| i | 0 | 1 | 2 | 3 | 4 | 5 |
|---|---|---|---|---|---|---|
| j | (p, q) | | | | | |
| 0 | (0, 0) | (0, 1) | (0, 5) | (0, 14) | (0, 38) | (0, 96) |
| 1 | (1, 0) | (1, 1) | (1, 5) | (1, 14) | (1, 38) | (1, 96) |
| 2 | (5, 0) | (5, 1) | (5, 5) | (5, 14) | (5, 38) | (5, 96) |
| 3 | (14, 0) | (14, 1) | (14, 5) | (14, 14) | (14, 38) | (14, 96) |
| 4 | (38, 0) | (38, 1) | (38, 5) | (38, 14) | (38, 38) | (38, 96) |
| 5 | (96, 0) | (96, 1) | (96, 5) | (96, 14) | (96, 38) | (96, 96) |

In order to use all the input data, the $m_{max}$ in Equation 6 is 159 (=256−1−96). The covariance matrix is reduced from 80 by 80 to only 6 by 6. In this latter case, there are only two eigenvectors corresponding to noise.

The scanning signal vector can be generated by Equation 3, with the time vector t being given by:

$$t = [t_0, t_1, t_5, t_{14}, t_{38}, t_{96}] \quad (7)$$

Figure 4A:
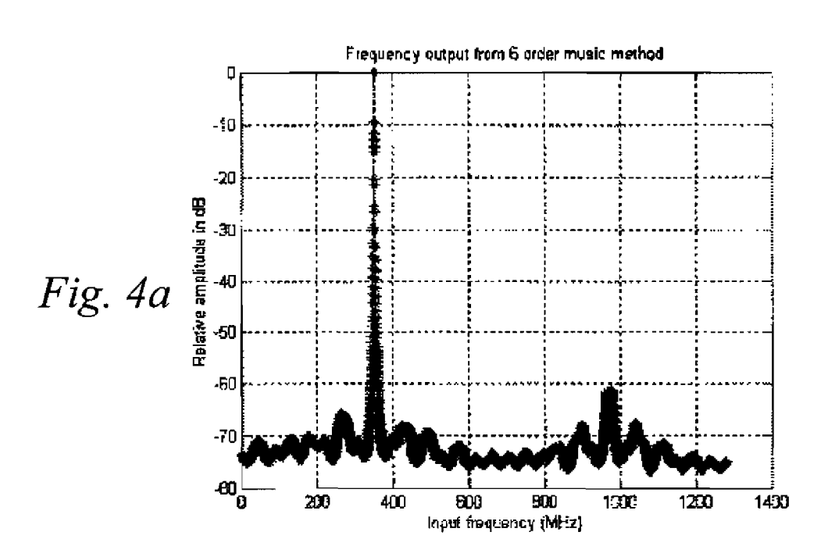
FIG. 4a is a graph of the computed frequency output over the entire frequency range from using a 6 order modified MUSIC method according to the teachings of the present invention.
Figure 4B:
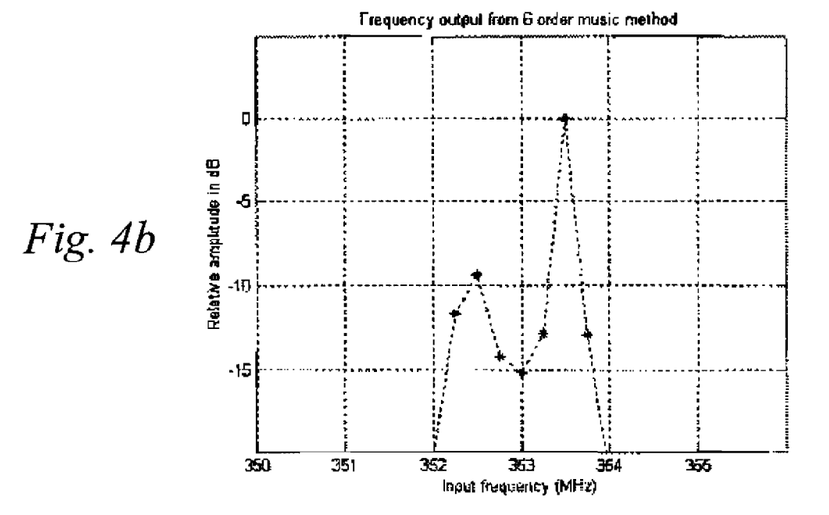
FIG. 4b is a close-up graph of the FIG. 4a results around the signal peaks.

The frequency resolution stays the same at 0.25 MHz. Using this reduced-order MUSIC method, the result is shown in FIGS. 4a and 4b. FIG. 4a shows the entire frequency range and FIG. 4b shows the close in plot of the input signal.

Comparing the result in FIG. 4a with that of FIGS. 2a and 3a, one can see that the noise floor is no longer smooth. However, the peak is still more than 60 dB above the maximum noise peak. The two frequencies are clearly shown in FIG. 4b, which is better than the 50 order conventional MUSIC method results.

Complex Signals

In this example, the input signals are complex. Complex data are collected from two channels with two ADCs. The two channels are 90 degrees out of phase. For complex signals, the order reduction of the MUSIC method is more significant because one eigenvalue corresponds to one signal. While for real signals, two eigenvalues correspond to one signal, in the following discussion, MUSIC method with order of 3 will be used.

The approach is similar to the previous example and the regular MUSIC method will not be described. Only the MUSIC method with order of 3 is discussed. The input data are:

$$z = z_0, z_1, z_2, \ldots z_{N-1} \quad (8)$$

where N is total number of data points and z is a complex number. The covariance matrix can be written as:

$$R_{ij} = \sum_{m=0}^{N-ord} x_{m+p} x_{m+q} \quad (9)$$

The relationship among i, j, p and q can be expressed in the following Table II for covariance matrix generation of order=3.

| i | 0 | 1 | 2 |
|---|---|---|---|
| j | (p,q) | | |
| 0 | (0, 0) | (0, 11) | (0, 128) |
| 1 | (11, 0) | (11, 11) | (11, 128) |
| 2 | (128, 0) | (128, 11) | (128, 128). |

As mentioned, this particular selection of values is only one of many possible. The values in these examples gave good results, but no specific rules were developed for selecting.

Figure 5A:
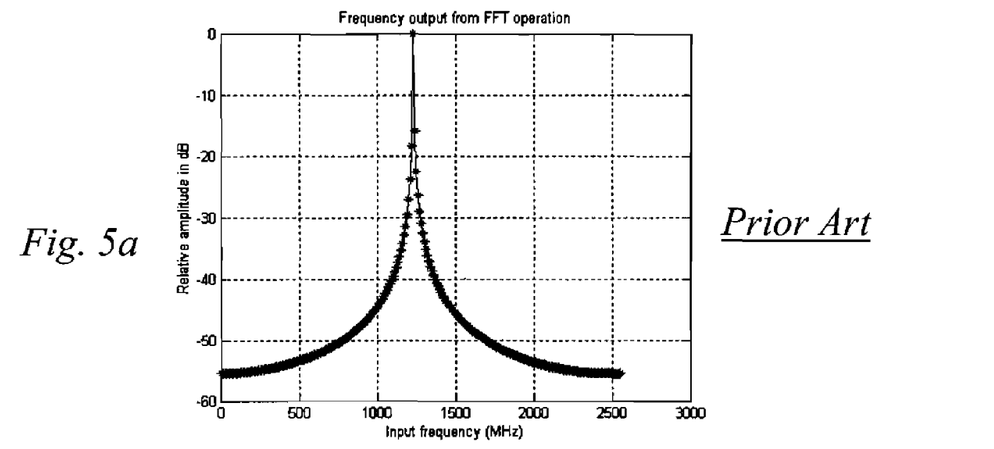
FIG. 5a is a graph of the computed frequency output over the entire frequency range from using FFT for resolving two signals from a set of complex signal data points according to the teachings of the prior art.
Figure 5B:
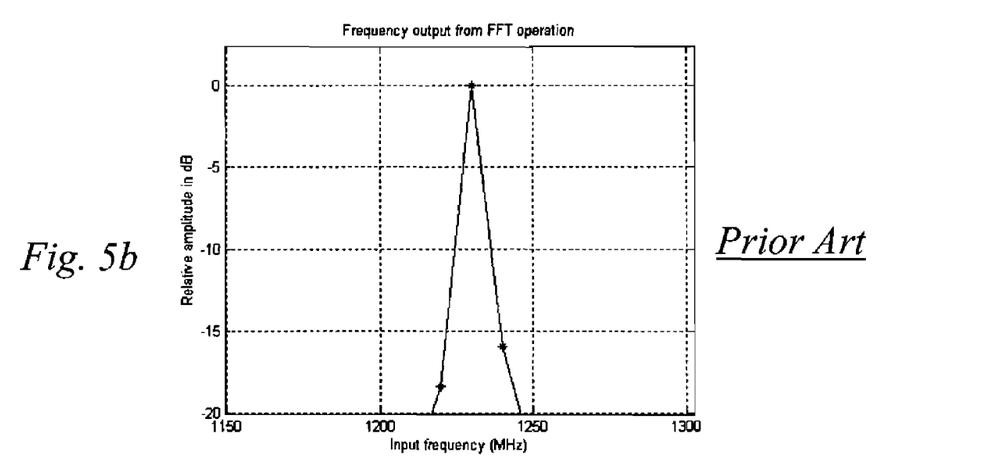
FIG. 5b is a close-up graph of the FIG. 5a results around the signal peak.

The input condition is the same as the previous example. Of the two complex signals, the strong signal is 100 dB above noise and the weak signal is 39 dB below the strong one. FIGS. 5a and 5b show the results of the FFT outputs. As expected, this approach cannot separate signals with close frequency separation.

Figure 6A:
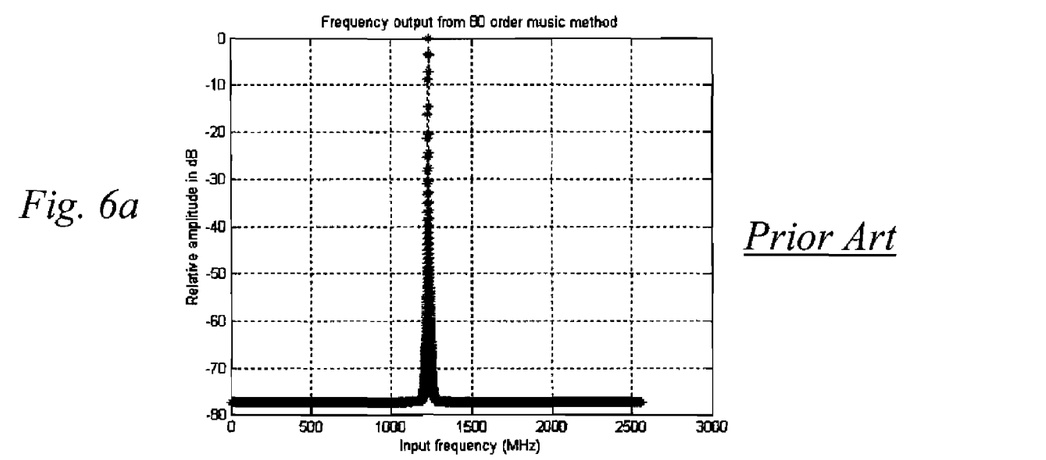
FIG. 6a is a graph of the computed frequency output over the entire frequency range from using an 80 order conventional MUSIC method for resolving two signals from a set of complex signal data points according to the teachings of the prior art.
Figure 6B:
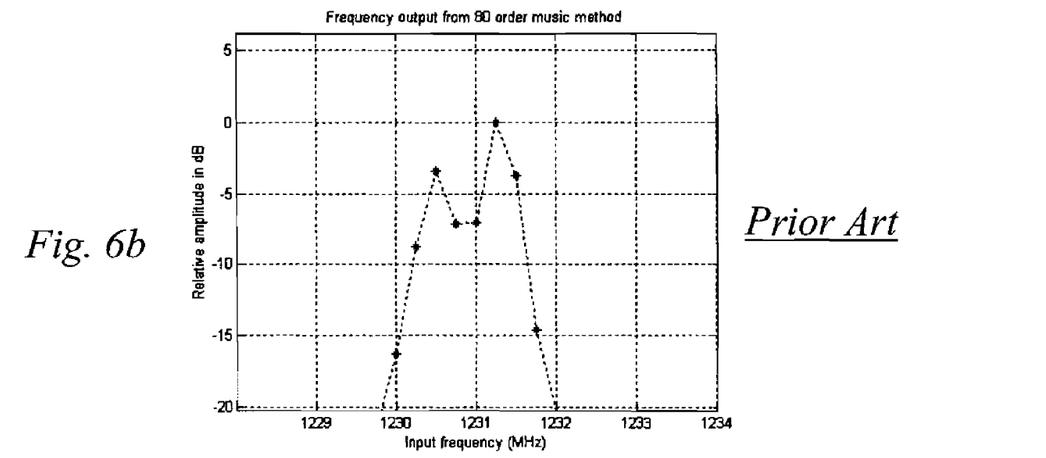
FIG. 6b is a close-up graph of the FIG. 6a results around the signal peaks.

FIGS. 6a and 6b show the results of MUSIC method with order=80. The separate frequencies are clearly shown in FIG. 6b.

Figure 7A:
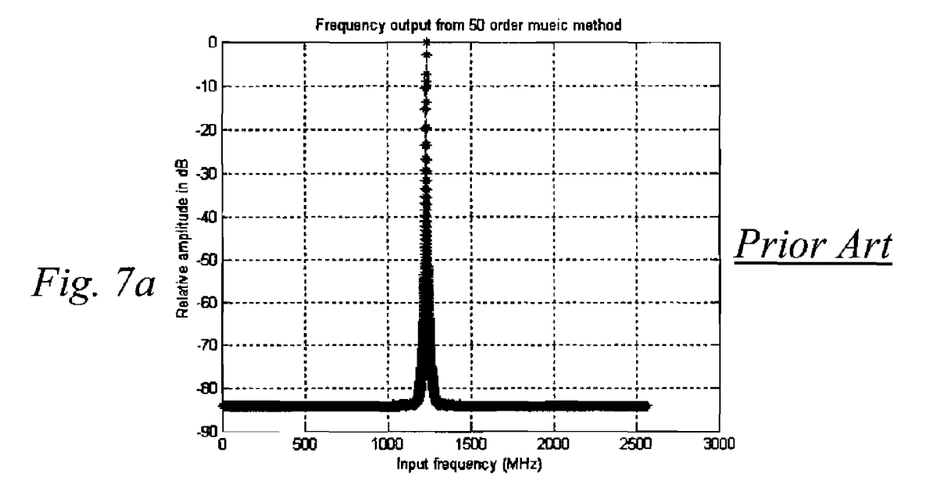
FIG. 7a is a graph of the computed frequency output over the entire frequency range from using a 50 order conventional MUSIC method for resolving two signals from a set of complex signal data points according to the teachings of the present invention.
Figure 7B:
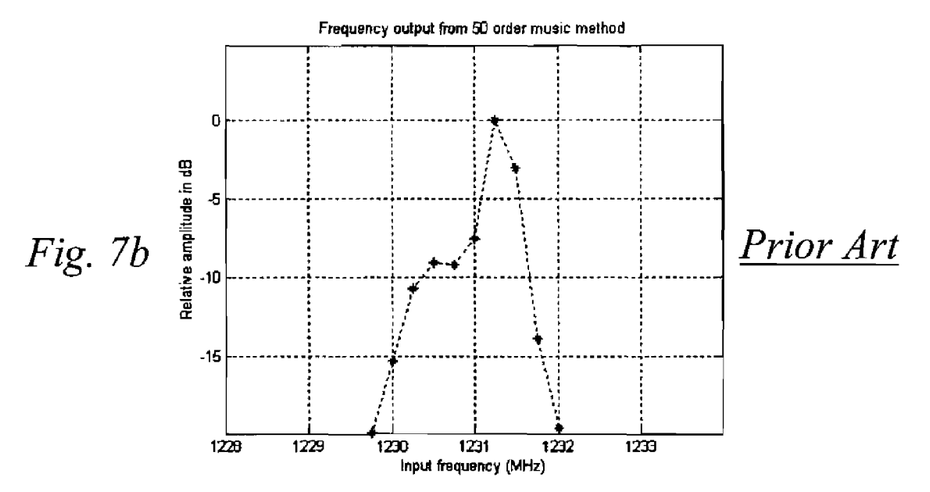
FIG. 7b is a close-up graph of the FIG. 7a results around the signal peak.

FIGS. 7a and 7b show the results of MUSIC method with order=50. Although the second frequency is shown in FIG. 7b, it might be difficult to detect because the dip between the two signals is shallow.

Figure 8A:
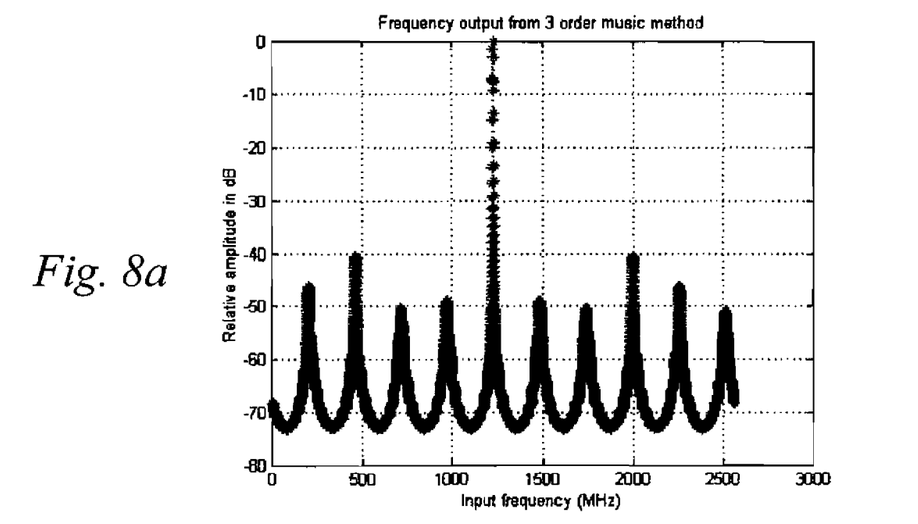
FIG. 8a is a graph of the computed frequency output from using a 3 order modified MUSIC method according to the teachings for resolving two signals from a set of complex data points.
Figure 8B:
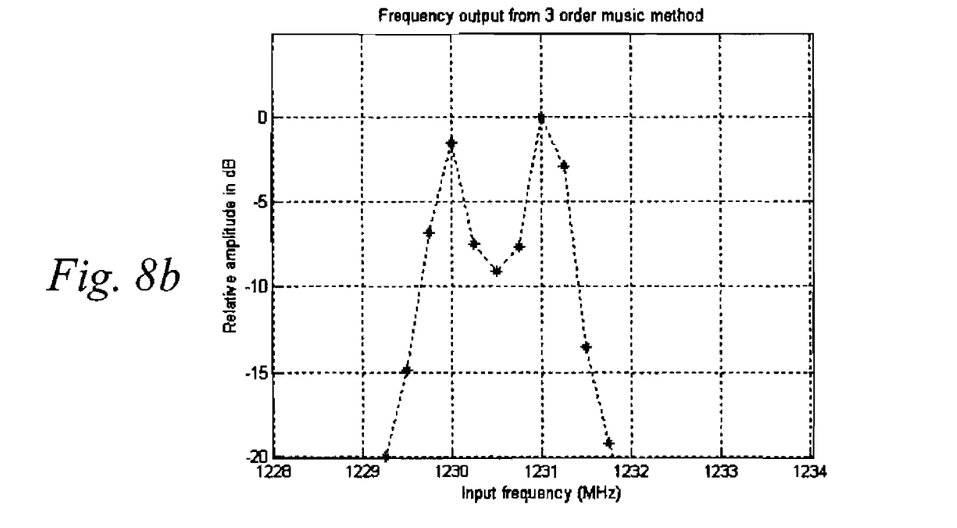
FIG. 8b is a close-up graph of the FIG. 8a results around the signal peaks.

FIG. 8 shows the results of using the MUSIC method according to the teachings of the present invention with order=3. The two frequencies are clearly shown in FIG. 8b.

In FIG. 8a, the outputs have many peaks, while the output from the high order MUSIC methods have only one peak as shown in FIGS. 6a and 7a. The number of signals can be determined by the eigenvalues. Once the number of signals is determined, the highest peaks can be used to determine the frequencies of the input.

Number of Simultaneous Signals Detection

The previous example uses an order of 6 for real input data, or an order of 3 for complex input data. Under these two cases, the numbers of the eigenvalues for the autocorrelation matrix are 6 and 3 for the real and complex input data, respectively. For a complex data case, each signal corresponds to one eigenvalue. If signal detection requires no frequency identification, three eigenvalues can be identified by three signals, and the maximum number of signals to be detected is three. If signal detection requires frequency identification as discussed above, one needs at least one noise eigenvector for noise subspace. In that case, the maximum number of signals to be detected with frequency identified is only two. This principle is also applicable to the real data case.

The teachings of the disclosed new and improved approach for applying the multiple signal classification (MUSIC) method to signal detection by using a low order covariance matrix, while specialized, will find application in other areas where promising mathematical techniques are presently too computationally demanding for real world uses, particularly for use in real time.

Terms used in the claims are used with their ordinary meanings as understood by those with skill in their application art areas. For example, the terms "traditional" and "conventional" are used interchangeably to refer to the original MUSIC method. Also, while the examples are described in terms of solving for the eigenvalues of a covariance matrix, the relationship between a covariance matrix and a correlation matrix, and the corresponding covariance and correlation of a variable with itself, the autocorrelation and autocovariance, respectively, are well-understood by those of ordinary skill in the art of the invention. Therefore, the claims are intended to include MUSIC method algorithms described in terms of solving for eigenvalues of an autocorrelation matrix as well as a covariance matrix.

Various other modifications to the invention as described may be made, as might occur to one with skill in the art of the invention, within the scope of the claims. Therefore, all contemplated embodiments have not been shown in complete detail. Other embodiments may be developed without departing from the spirit of the invention or from the scope of the claims.

We claim:

1. A method for high spectral resolution using the Multiple Signal Classification (MUSIC) method, including a step of forming a covariance matrix from a set of real data points, wherein the covariance matrix is in the form of:

$$R_{ij} = \sum_{m=0}^{m_{max}} x_{m+p} x_{m+q};$$

where $m_{max}$ is the total number of real data points minus 1 minus 96;
where x is the value of each real data point; and
wherein the relationship between i,j and p,q is according to the following table:

| j | (p, q) | i | 0 | 1 | 2 | 3 | 4 | 5 |
|---|--------|---|---|---|---|---|---|---|
| 0 |        |   | (0, 0) | (0, 1) | (0, 5) | (0, 14) | (0, 38) | (0, 96) |
| 1 |        |   | (1, 0) | (1, 1) | (1, 5) | (1, 14) | (1, 38) | (1, 96) |
| 2 |        |   | (5, 0) | (5, 1) | (5, 5) | (5, 14) | (5, 38) | (5, 96) |
| 3 |        |   | (14, 0) | (14, 1) | (14, 5) | (14, 14) | (14, 38) | (14, 96) |
| 4 |        |   | (38, 0) | (38, 1) | (38, 5) | (38, 14) | (38, 38) | (38, 96) |
| 5 |        |   | (96, 0) | (96, 1) | (96, 5) | (96, 14) | (96, 38) | (96, 96). |

2. A method for high spectral resolution using the Multiple Signal Classification (MUSIC) method, including a step of forming a covariance matrix from a set of complex data points, wherein the covariance matrix is in the form of:

$$R_{ij} = \sum_{m=0}^{N-ord} x_{m+p} x_{m+q};$$

where N is the total number of complex data points;
where ord is the order of the covariance matrix and is 3;
where x is the value of each complex data point; and,
wherein the relationship between i,j and p,q is according to the following table:

| j | (p, q) | i | 0 | 1 | 2 |
|---|--------|---|---|---|---|
| 0 |        |   | (0, 0) | (0, 11) | (0, 128) |
| 1 |        |   | (11, 0) | (11, 11) | (11, 128) |
| 2 |        |   | (128, 0) | (128, 11) | (128, 128). |

* * * * *